US008963009B2

(12) United States Patent
Leifer et al.

(10) Patent No.: US 8,963,009 B2
(45) Date of Patent: Feb. 24, 2015

(54) DEVICE FOR DETACHABLY FIXING A CURRENT CONDUCTOR TO A CURRENT TRANSFORMER HOUSING

(75) Inventors: Christoph Leifer, Bad Driburg (DE); Carsten Thoerner, Melle (DE); Dat-Minh Trinh, Barntrup (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 101 days.

(21) Appl. No.: 13/824,300

(22) PCT Filed: Oct. 7, 2011

(86) PCT No.: PCT/EP2011/067611
§ 371 (c)(1),
(2), (4) Date: Jun. 5, 2013

(87) PCT Pub. No.: WO2012/045885
PCT Pub. Date: Apr. 12, 2012

(65) Prior Publication Data
US 2013/0240248 A1   Sep. 19, 2013

(30) Foreign Application Priority Data

Oct. 7, 2010  (DE) .......................... 10 2010 038 042
Oct. 7, 2010  (DE) ..................... 20 2010 008 750 U

(51) Int. Cl.
*H02G 5/00*   (2006.01)
*H01F 38/30*  (2006.01)

(52) U.S. Cl.
CPC . *H02G 5/00* (2013.01); *H01F 38/30* (2013.01)
USPC ............................. 174/135; 174/50; 439/257

(58) Field of Classification Search
USPC .............. 174/135, 50; 439/261, 257; 411/554
See application file for complete search history.

(56) References Cited

U.S. PATENT DOCUMENTS

| 4,258,348 A | * | 3/1981 | Belfer et al. | ..................... 336/73 |
| 4,981,444 A | * | 1/1991 | Willmott | ....................... 439/459 |
| 2007/0285201 A1 | | 12/2007 | Nobuyuki et al. | |
| 2012/0315778 A1 | | 12/2012 | Leifer et al. | |

FOREIGN PATENT DOCUMENTS

| DE | 19733852 | 2/1999 |
| DE | 198 33 150 | 10/1999 |

(Continued)

OTHER PUBLICATIONS

International Bureau, English Translation of International Search Report for International Application No. PCT/EP/2011/067611, Apr. 12, 2013, pp. 1-2, Geneva, Switzerland.

(Continued)

*Primary Examiner* — Dhirubhai R Patel
(74) *Attorney, Agent, or Firm* — Ohlandt, Greeley, Ruggiero & Perle, LLP

(57) ABSTRACT

A device for detachably fastening a current conductor to a current transformer housing includes the current transformer housing, a retaining element that is guided through the current transformer housing, a fastening element that is guided through the retaining element, and a clamping element. The fastening element and/or the retaining element are seated against at least some regions of the surface of the current conductor when the current conductor is fastened to the current transformer housing. The fastening element can be rotated about the longitudinal axis thereof so as to fasten and/or detach the current conductor. The clamping element is arranged movably on the current transformer housing so that, in a first position, it allows a translatory displacement of the retaining element along the longitudinal axis. In a second position, the clamping element prevents the transtatory displacement of the retaining element along the longitudinal axis thereof.

6 Claims, 4 Drawing Sheets

(56) References Cited

FOREIGN PATENT DOCUMENTS

| EP | 1 217 230 | 6/2002 |
|----|-----------|--------|
| JP | 57 192014 | 11/1982 |
| JP | 03119604 | 12/1991 |
| JP | 5933223 | 12/1991 |
| JP | 07119715 A | 5/1995 |
| JP | 2004036709 A | 2/2004 |

OTHER PUBLICATIONS

International Bureau, English Translation of the Written Opinion of the International Search Authority for International Application No. PCT/EP/2011/067611, Apr. 7, 2013, pp. 1-11, Geneva, Switzerland.

International Bureau, English Translation of International Preliminary Report on Patentability Chapter I for International Application No. PCT/EP/2011/067611, Apr. 13, 2012, pp. 1-12, Geneva, Switzerland.

* cited by examiner

DEVICE FOR DETACHABLY FIXING A CURRENT CONDUCTOR TO A CURRENT TRANSFORMER HOUSING

CROSS-REFERENCE TO RELATED APPLICATIONS

This application is a United States national stage entry of International Application serial no. PCT/EP2011/067611 filed Oct. 7, 2011, which claims priority to German Patent Applications serial nos. DE 20 2010 008 750.3 and DE 10 2010 038 042.3, each filed Oct. 7, 2010. The contents of each prior application are incorporated herein by reference in their entirety as if set forth verbatim.

FIELD

The invention relates to a device for detachably fastening a current conductor to a current transformer housing, comprising a current transformer housing, a retaining element that is guided through the current transformer housing, a fastening element that is guided through the retaining element, and a clamping element.

BACKGROUND

It is known from the prior art to guide a current conductor through an opening that is provided in a current transformer housing, wherein the current conductor is usually fastened to the current transformer housing by way of two screws or threaded pins, which are guided in two retaining elements arranged on the current transformer housing. For fastening purposes, the screws or the threaded pins are rotated inside the retaining elements in the direction of the current conductor by a purely rotatory motion until the cross-sectional surfaces thereof are seated on the surface of the current conductor. By continuing the rotation of the screws or the threaded pins, the current conductor is fixed in the current transformer housing.

The disadvantage here is that the threaded pins or the screws must cover a relatively long distance for the fastening on the current conductor, wherein this is achieved solely by a purely rotatory motion, which requires a lot of force and is very time-consuming, in particular if a larger number of current transformer housings are to be fixed on a current conductor.

Thus, it is the object of the invention to provide a device for fastening a current conductor to a current transformer housing which is characterized by simpler and faster installation. This object and others is attained by the various embodiments and features disclosed and claimed below.

SUMMARY

A solution of the object described above thus consists in a device for detachably fastening a current conductor to a current transformer housing, comprising the current transformer housing, a retaining element that is guided through the current transformer housing, a fastening element that is guided through the retaining element, and a clamping element, wherein the fastening element and/or the retaining element are seated against at least some regions of the surface of the current conductor when the current conductor is fastened to the current transformer housing, the fastening element can be rotated in a rotatory manner about the longitudinal axis thereof so as to fasten and/or detach the current conductor, and the clamping element is arranged movably on the current transformer housing so that, in a first position, the clamping element allows a translatory displacement of the retaining element along the longitudinal axis thereof so as to fasten and/or detach the current conductor and, in a second position, prevents the translatory displacement of the retaining element along the longitudinal axis thereof so as to detach the current conductor.

According to the disclosed embodiments, the current conductor can thus be fastened to the current conductor both by a translatory motion of the retaining element and by a rotatory motion of the fastening element, which is to say by two basically independent motions of the retaining element and the fastening element. However, because the fastening element is guided through the retaining element, a translatory displacement of the retaining element also moves the fastening element in a translatory manner. For the purpose of fastening the current conductor, the retaining element and the fastening element can thus be moved relative to each other so that preferably the retaining element first performs a purely translatory motion until the retaining element impinges on the surface of the current conductor, and then final fixation of the current conductor takes place by way of a rotatory motion of the fastening element, which is guided through the retaining element. To this end, it is preferred for the retaining element to be guided through a through-passage that is formed on the current transformer housing and for the fastening element to be guided through a through-passage that is formed on the retaining element. As a result, the device according to the disclosed embodiments thus allows particularly simple and fast fastening of a current conductor to a current transformer housing. Because in a preferred embodiment the distance that can be covered per unit of time is greater with the translatory displacement of the retaining element toward the surface of the current conductor than with the rotatory motion of the fastening element about the longitudinal axis thereof, the device according to the disclosed embodiments constitutes a so-called "quick fastening device" for detachably fastening a current conductor to a current transformer housing.

The fastening element and/or the retaining element preferably each have the shape of an elongated pin-like element, which for the purpose of fastening the current conductor can be moved in the direction along the respective longitudinal axis thereof. So as to fasten the current conductor, the fastening element and/or the retaining element can be moved in the direction of the current conductor, and so as to detach the current conductor, the fastening element and/or the retaining element can be moved away from the current conductor, wherein the fastening element and/or the retaining element are preferably arranged relative to the current conductor, or are guided to the current conductor, so that the longitudinal axis of the fastening element or of the retaining element is arranged substantially transversely relative to the longitudinal axis of the current conductor. In the fastened state, in which the current conductor is fixed on the current transformer housing, the respective cross-sectional surface of the fastening element and/or of the retaining element is preferably seated against the surface of the current conductor.

So as to fasten the current conductor to the current transformer housing, preferably the clamping element is first transferred into the first position, so that a translatory displacement of the retaining element along the longitudinal axis thereof is possible so as to fasten the current conductor. The retaining element can then be moved in a translatory manner in the direction of the current conductor until the retaining element impinges on the surface of the current conductor or ends up in the vicinity of the current conductor. Preferably thereafter, the clamping element is transferred from the first position thereof into the second position, whereby the translatory motion of the retaining element for the detachment from the current conductor is prevented, which is to say impossible. It is further preferred for the translatory displacement of the retaining element along the longitudinal axis thereof for the detachment and for the fastening of the current conductor to be prevented in the second position. For the final fixation of the current conductor on the current transformer housing, the fastening element, which is guided in the retaining element, can then be rotated in a rotatory manner about the longitudinal axis thereof until preferably the cross-sectional surface of the fastening element impinges on the surface of the current conductor.

The solution according to the disclosed embodiments is thus characterized in that a purely rotatory motion of the fastening element is no longer required so as to fasten a current conductor to a current transformer housing, but in the first position of the clamping element, the fastening element—guided in the retaining element—is first moved in a translatory manner in the direction of the current conductor and then, in the second position of the clamping element, after the retaining element is fixed in the current transformer housing by way of the clamping element, is moved in a rotatory manner in the direction of the current conductor. It is thus possible to significantly reduce both the complexity of the installation of the fastening element on the current conductor and the time that is required to do so, so that the device according to the disclosed embodiments allows "quick fastening" of a current conductor to a current transformer housing. This quick fastening can preferably be carried out without requiring an additional tool for fastening. So as to achieve uniform fastening, preferably two mutually opposing lateral faces of the current transformer housing are preferably provided with a respective retaining element having a fastening element arranged therein, wherein a respective retaining element can be fixed on or detached from the current transformer housing by way of a respective clamping element.

In general, a person skilled in the art can provide a variety of means so as to enable or prevent the translatory displacement of the retaining element. However, according to an advantageous embodiment of the invention the outer lateral face of the retaining element preferably comprises a detent means, and the clamping element or the current transformer housing comprises a detent element that corresponds to the detent means, with the detent means being disengaged from the detent element in the first position and the detent means being latchingly engaged with the detent element in the second position. The detent means and/or the detent element can be designed as any arbitrary means known from the prior art for forming a latching engagement between the retaining element and the clamping element or the current transformer housing, which is to say a hook or a lug, for example. It is further preferred for the remaining outer lateral faces of the retaining element to form a smooth surface at least in some regions, so that in the first position of the clamping element the retaining element can be easily displaced in the current transformer housing in a translatory manner by creating the least possible friction between the substantially planar other outer lateral faces of the retaining element and between the current transformer housing.

In this connection it is particularly preferred for the detent means and/or the detent element to be designed so that, in the second position of the clamping element, the retaining element can be displaced in a translatory manner along the longitudinal axis thereof so as to fasten the current conductor. Thus, while in the second position of the clamping element the translatory displacement of the retaining element along the longitudinal axis thereof so as to detach the current conductor is prevented, a translatory displacement of the retaining element so as to fasten the current conductor is preferably possible. Such a configuration can be achieved, for example, in that both the detent means and the detent element comprise hooks or lugs that can be latchingly engaged with one another, thus allowing only a displacement of the retaining element for fastening the current conductor, but not for detaching the current conductor. Such a configuration forms a quick fastening option in that the clamping element can be "quickly displaced" in a translatory manner by "through-ratcheting" the detent means with respect to the detent element so as to fasten the current conductor.

In general, the clamping element can take on any arbitrary design to allow or prevent the translatory displacement of the retaining element, for example in the form of a plastic locking bar. However, according to a preferred embodiment of the invention, the clamping element is pivotably arranged on the current transformer housing, the pivot axis of the clamping element is perpendicular to the longitudinal axis of the retaining element, a gap is formed between the clamping element and the retaining element in the first position, and the clamping element is seated with contact against the retaining element in the second position. Such a configuration has the advantage that the clamping element is particularly easily, for example using a tool and/or by hand, pivoted from the first position to the second position, or from the second position to the first position, so that the retaining element can be or cannot be displaced in a translatory manner in the current transformer housing. To this end, the clamping element can, for example, comprise a device for inserting a tool, by way of which the clamping element can be pivoted. Such a tool can be designed as a screwdriver, for example. With regard to this embodiment, according to a further configuration of the invention it is particularly preferred if the clamping element can be latchingly engaged with the current conductor housing in the first position and/or in the second position. For example, this can be implemented in that the clamping element comprises a detent means which latchingly engages in a corresponding opening in the current conductor housing, for example in the first position and/or in the second position. Such a configuration has the advantage that the clamping element does not pivot from the second position to the first position without, for example, an operator pivoting the clamping element by way of the tool between the positions, so that the current conductor can be detached from the retaining element.

However, according to an alternative preferred embodiment of the invention, the clamping element is displaceably arranged on the current transformer housing, so that the axis of displacement of the clamping element is arranged essentially at an angle of 45° relative to the longitudinal axis of the retaining element, wherein a gap is formed between the clamping element and the retaining element in the first position, and the clamping element is seated with contact against the retaining element in the second position. According to this embodiment, the clamping element is thus displaceably arranged on the current transformer housing so that the clamping element can be displaced from the first position to the second position, and back, for example actuated by a tool and/or by hand. The clamping element is preferably designed so that the clamping element can be detached from the retaining element by actuation of the tool in the direction of the current conductor, so that the retaining element can be displaced in a translatory manner in the current transformer housing. This configuration thus has the advantage that the clamping element can be actuated particularly easily, for example by way of a screwdriver and/or by finger pressure. In this connection it is further preferred according to another embodiment of the invention for the angle of essentially 45° to be formed between the axis of displacement of the clamping element and the longitudinal axis of the retaining element extending in the direction of the current conductor. In the second position, a movement of the retaining element away from the current conductor, for example effected by a rotatory motion of the fastening element toward the current conductor, thus increases the pressing pressure between the clamping element and the retaining element, which results in improved and self-locking fixation of the retaining element on the current transformer housing.

It is further preferred to provide a spring, for example a metal spring, so that a spring force can act on the clamping element, whereby the clamping element strives to move from the first position to the second position. Such a configuration, for example, allows the clamping element to be easily displaced toward the current conductor, wherein a return motion of the retaining element away from the current conductor is prevented.

A variety of options are conceivable for designing the rotatory motion of the fastening element about the longitudinal axis thereof in the retaining element. According to a preferred embodiment of the invention, the fastening element is designed as a screw, wherein the retaining element comprises a thread and the screw can be rotated in the thread in a rotatory manner so as to fasten or detach the current conductor. It is further preferred in this context if the retaining element comprises a seat for the thread so that the thread cannot be displaced in the retaining element in a translatory manner along the longitudinal axis of the retaining element. It is particularly preferred for the seat for the thread to be designed such that the thread can be inserted in the retaining element from a lateral face of the retaining element. The thread is preferably designed as a nut, as a square nut, as a hexagon nut and/or as an insert nut.

According to a further particularly preferred embodiment of the invention, the device comprises a receiving element that is arranged on the current transformer housing, wherein the retaining element is guided through the receiving element, the fastening element is arranged on the retaining element, and the receiving element is detachably fastened to the current transformer housing. The receiving element preferably takes on the form of a plastic holder or the form of a flange, which is arranged on a lateral face of the current transformer housing. The retaining element is preferably guided through a through-passage that is formed in the receiving element. Such a configuration has the great advantage that a current transformer housing already known from the prior art can be "subsequently" retrofitted with a receiving element, wherein the receiving element comprises the retaining element, the fastening element and the clamping element. In keeping with the embodiment described above, it is preferred for the detent means to be arranged on the receiving element.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Figure 1:
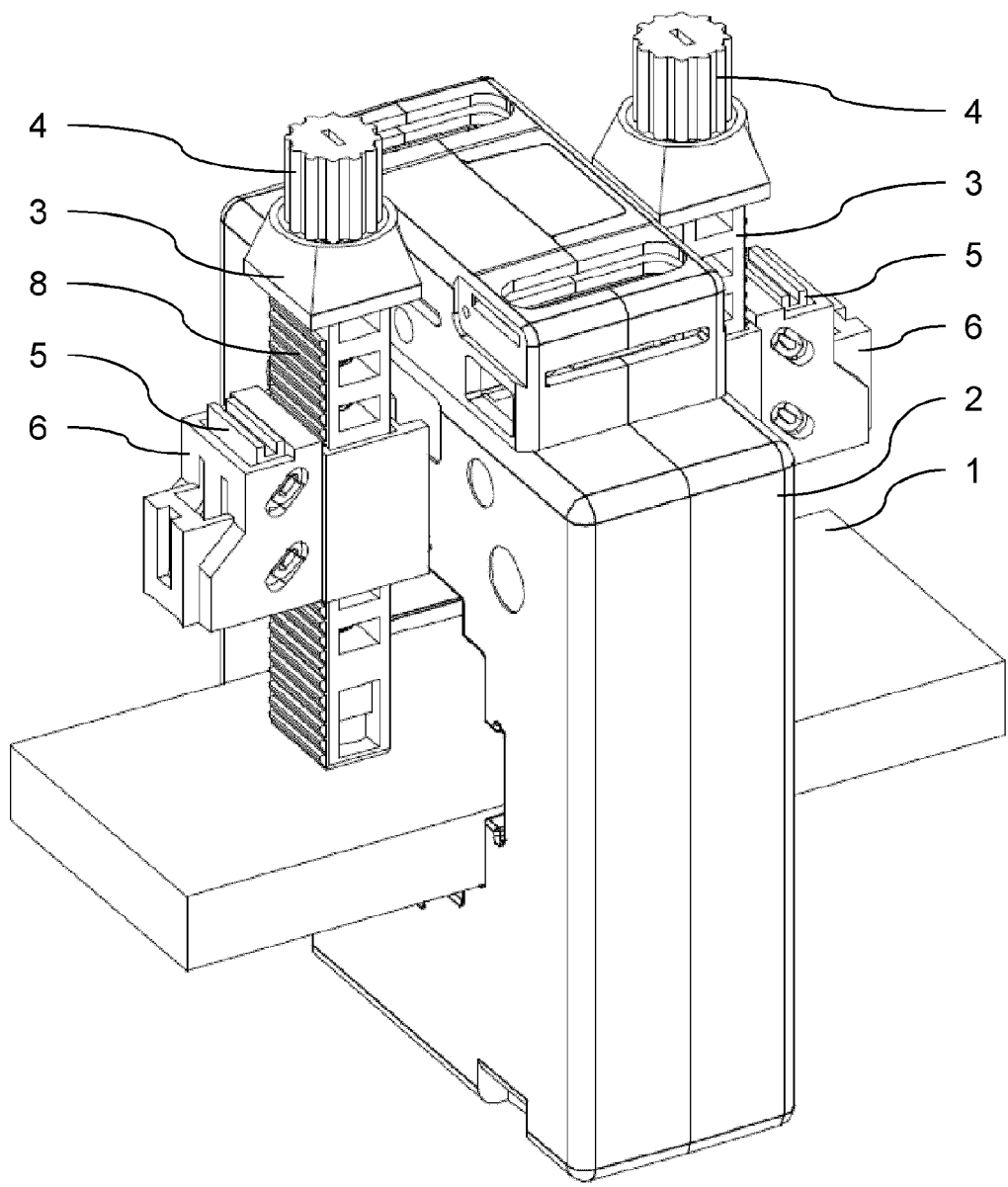
FIG. 1 is a perspective view of a device according to a preferred exemplary embodiment of the invention.
Figure 2:
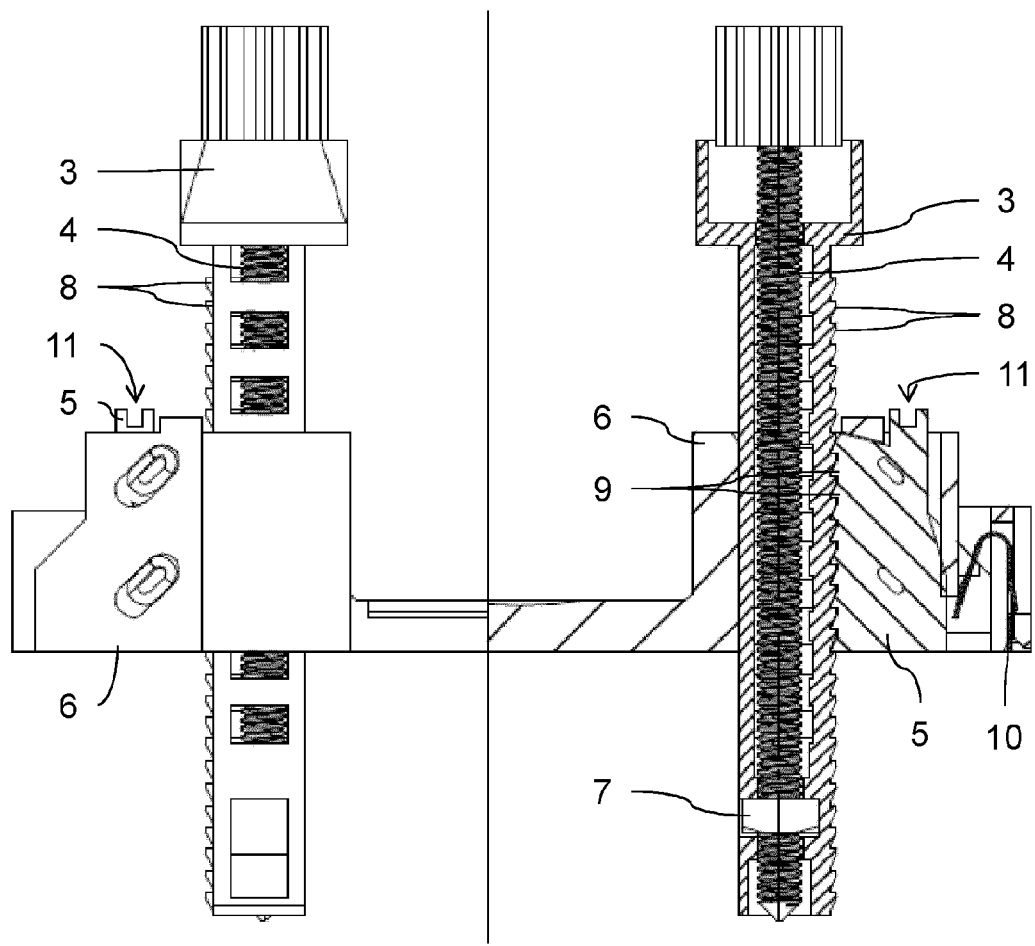
FIG. 2 is a combined lateral/sectional view of a receiving element, comprising a retaining element, a fastening element and a clamping element according to the preferred exemplary embodiment of the invention.

FIG. 1 and FIG. 2 each show a perspective view of a device according to a first preferred exemplary embodiment of the invention. The device for detachably fastening a current conductor 1 to a current transformer housing 2 comprises the current transformer housing 2, a retaining element 3 that is guided through the current transformer housing 2, a fastening element 4 that is guided through the retaining element 3, and a clamping element 5.

Figure 4:
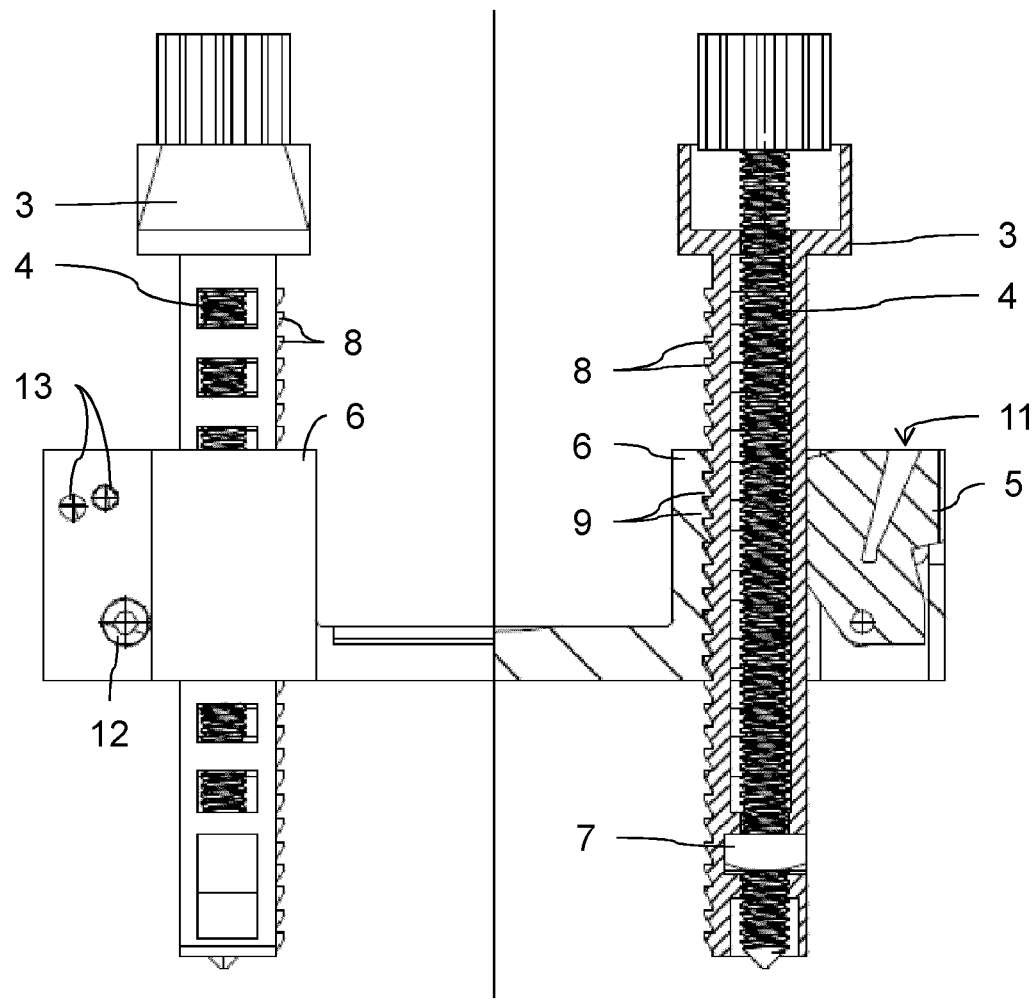
FIG. 4 is a combined lateral/sectional view of a receiving element, comprising a retaining element, a fastening element and a clamping element according to the further preferred exemplary embodiment of the invention.

As is apparent from FIG. 2 and FIG. 4, the retaining element 3 and the clamping element 5 are arranged in a receiving element 6, wherein the receiving element 6 is detachably fastened to the current transformer housing 2. For this purpose, the receiving element 6 or the current transformer housing 2 comprises a detent device, which is not shown, however the receiving element 6 can also be fixed on the current transformer housing 2 without such a detent device, as will be described hereafter.

The fastening element 4 is a screw which comprises an encapsulated head and can be rotated in a rotatory manner about the longitudinal axis thereof in a thread 7 designed as a nut so as to fasten or detach the current conductor 1. The fastening element 4 designed as the screw and the nut are arranged in the retaining element 3 so that the retaining element 3, and thus also the fastening element 4, can be moved in the receiving element 6, and consequently also in the current transformer housing 2, in a translatory manner along the longitudinal axis of the retaining element 3 toward the current conductor so as to fasten the same or away so as to detach the current conductor 1. When the current conductor 1 is fastened, the fastening element 4 and/or the retaining element 3 are thus seated against at least some regions of the surface of the current conductor 1.

The clamping element 5 is arranged movably on the receiving element 6 or on the current transformer housing 2 so that, in a first position, the clamping element 6 allows the translatory displacement of the retaining element 3 along the longitudinal axis thereof so as to fasten or detach the current conductor 1. In contrast, in a second position of the clamping element 5, the translatory displacement of the retaining element 3 along the longitudinal axis thereof for detaching the current conductor 1 is prevented by the clamping element 5.

For this purpose, according to the first embodiment shown in FIGS. 1 and 2, the outer lateral face of the retaining element 3 comprises a detent means 8, which in the present example is designed as a lug. The clamping element 5 further comprises a detent element 9, which corresponds to the detent means 8 and is designed as a hook. In the first position, which is shown in FIG. 2, the detent means 8 engages with the corresponding detent element 9, so that the translatory displacement of the retaining element 3 for the purpose of detaching the current conductor 1 is prevented. However, it is nonetheless possible to displace the retaining element 3 toward the current conductor 1 by "through-ratcheting" the detent means 8 through the detent element 9.

According to FIGS. 1 and 2, the clamping element 5 is displaceably arranged on the receiving element 6 or on the current transformer housing 2, so that the axis of displacement of the clamping element 5 is at an angle of 45° relative to the longitudinal axis of the retaining element 3. Moreover, a spring 10 is provided, which applies a spring force to the clamping element 5 so that the clamping element 5 strives to move from the first position to the second position. In the first position, which is not shown, the detent means 8 does not latchingly engage with the detent element 9, so that the retaining element 3 can be displaced freely in a translatory manner along the longitudinal axis thereof so as to fasten or detach the current conductor 1. A seat 11 is provided so as to transfer the clamping element 5 from the second position to the first position, wherein the seat can be actuated by way of a screwdriver or by hand, or by a finger, for example.

Figure 3:
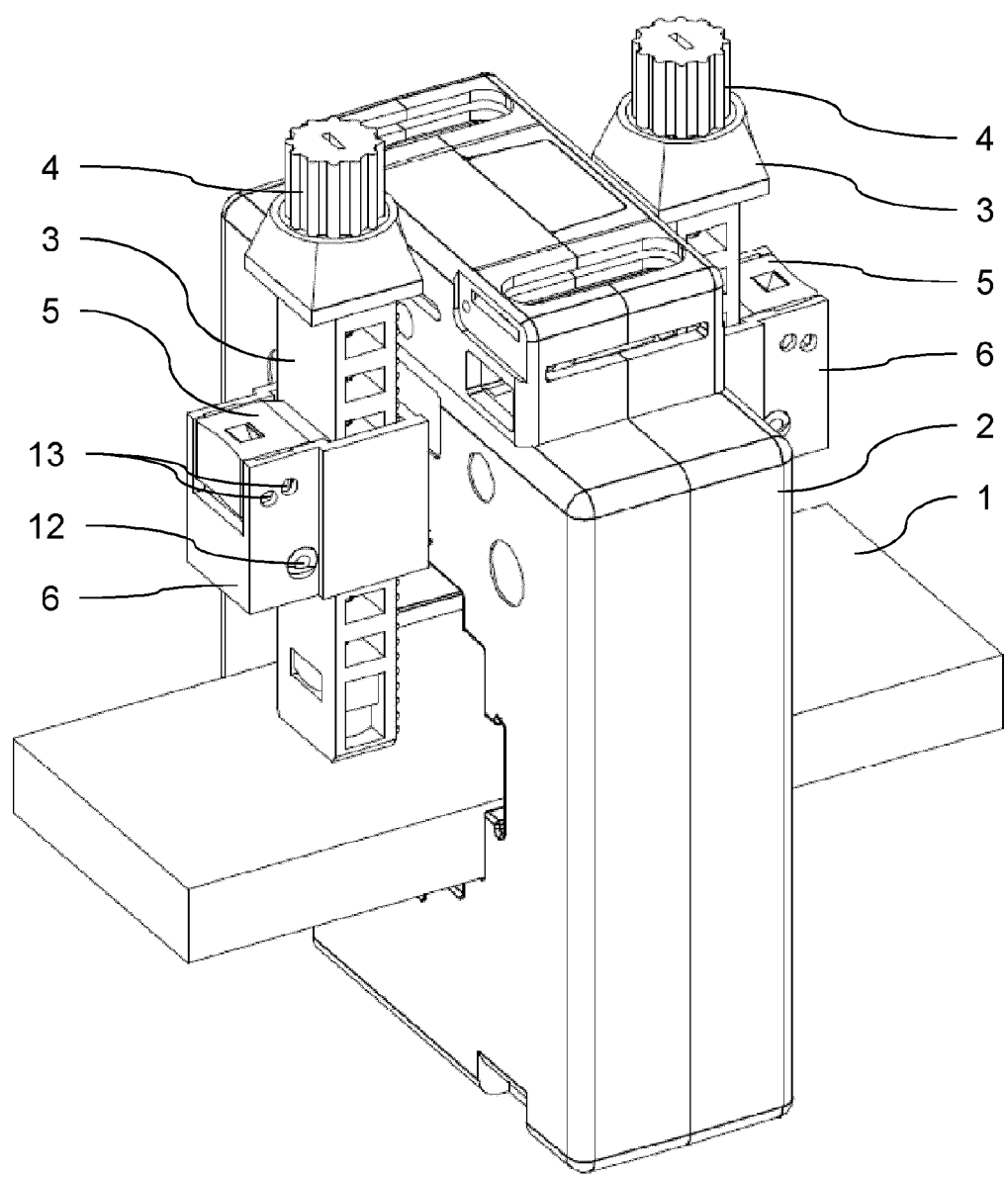
FIG. 3 is a perspective view of a device according to a further preferred exemplary embodiment of the invention.

According to another embodiment of the invention, which is shown in FIG. 3 and FIG. 4, the clamping element 5 is pivotably arranged on the receiving element 6 or on the current transformer housing 2 so that the pivot axis 12 is perpendicular to the longitudinal axis of the retaining element 3. To this end, the clamping element 5 can be pivoted such that, in the first position, a gap is formed between the clamping element 5 and the retaining element 3, whereby the retaining element 3 can be displaced freely in a translatory manner along the longitudinal axis thereof in the receiving element 6 or in the current transformer housing 2. In contrast, in the second position of the clamping element 5, as is shown in FIG. 4, the clamping element 5 is seated with contact against the retaining element 3, so that the retaining element 3 is fixed non-displaceably in a translatory manner along the longitudinal axis thereof. According to this embodiment of the invention, the detent element 9 is arranged on the receiving element 6 or on the current transformer housing 2.

The clamping element 6 further comprises means for the latching engagement with the receiving element 6 or with the current transformer housing 2, which in the present example are designed as detent means, which engage in corresponding openings 13 of the receiving element 6 or of the current transformer housing 2. In this configuration, the clamping element 5 likewise comprises a seat 11, in which a tool can be inserted, wherein the tool can be used to pivot the clamping element 5 from the first position to the second position, or conversely, so as to fix or detach the retaining element 3.

What is claimed is:

1. A device for detachably fastening a current conductor to a current transformer housing when the current conductor is placed in association with the current transformer housing, the device comprising:
   the current transformer housing comprising a plurality of parallel sides and an opening connecting two of parallel sides for passing the current conductor therethrough;
   a receiving element having an open configuration detachably connected to one of the parallel sides;
   a substantially linear retaining element having a length with a first longitudinal axis, the length having an exterior surface, a hollow interior and a plurality of engageable detent elements on the exterior surface, wherein the retaining element is disposed through the open configuration of the receiving element substantially so that the first longitudinal axis is substantially parallel to one of the parallel sides, and wherein the retaining element can move through the open configuration of the receiving element in a direction along the first longitudinal axis;
   a fastening element having a second longitudinal axis, wherein the fastening element passes through the hollow interior of the retaining element substantially parallel to one of the parallel sides; and
   a clamping element associated with the receiving element or the transformer housing, the clamping element having a surface for engaging and disengaging the plurality of engageable detent elements, wherein the clamping element is movable between a first position and a second position, wherein, in the first position, the surface of the clamping element is disengaged from the plurality of engageable detent elements to allow movement of the retaining element in a direction along the second longitudinal axis, and wherein, in the second position, the surface of the clamping element engages the plurality of engagable detent elements to prevent movement of the retaining element in the direction along the second longitudinal axis,
   wherein the fastening element or the retaining element is moved into contact with a surface of the current conductor, the surface having passed through the opening, and wherein the fastening element or the retaining element fasten the current conductor when the clamping element is in the second position.

2. A device according to claim 1, wherein the clamping element is movable between a first position and a second position on a pivot axis perpendicular to the first longitudinal axis.

3. A device according to claim 1, wherein the clamping element is arranged on the current transformer housing and is moveable between a first position and a second position on a pivot axis at an angle of about 45° relative to the first longitudinal axis, wherein, in the first position, a gap is formed between the surface of the clamping element and the engageable elements, and wherein, in the second position, the surface of the clamping element engages the engageable elements.

4. The device according to claim 3, wherein the angle of about 45° is formed between the axis of displacement and the first length in the direction of the current conductor.

5. The device according to claim 3, further comprising a spring having a spring force, wherein the spring force urges the clamping element to move between the first and second positions.

6. A device according to claim 1, wherein the fastening element comprises a screw portion and the retaining element comprises a thread portion, wherein the screw portion can be rotated in the thread portion to fasten or detach the current conductor to the current conductor housing.

* * * * *